United States Patent
Ryal

(10) Patent No.: US 8,160,418 B2
(45) Date of Patent: Apr. 17, 2012

(54) METHODS FOR CONTENT REDISTRIBUTION WITHIN NETWORKED RECORDING DEVICES

(75) Inventor: Kim A. Ryal, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/869,646

(22) Filed: Aug. 26, 2010

(65) Prior Publication Data

US 2010/0325679 A1 Dec. 23, 2010

Related U.S. Application Data

(62) Division of application No. 10/652,793, filed on Aug. 29, 2003, now abandoned.

(51) Int. Cl.
*H04N 5/765* (2006.01)
(52) U.S. Cl. .................. 386/200; 386/295
(58) Field of Classification Search .......... 386/295, 386/200, 231
See application file for complete search history.

(56) References Cited

U.S. PATENT DOCUMENTS

| | | | |
|---|---|---|---|
| 5,351,075 A | 9/1994 | Herz et al. | |
| 5,568,635 A | 10/1996 | Yamaguchi | |
| 5,617,518 A | 4/1997 | Kuwamoto et al. | |
| 5,825,739 A | 10/1998 | Saito et al. | |
| 5,861,906 A | 1/1999 | Dunn et al. | |
| 6,233,389 B1 | 5/2001 | Barton et al. | |
| 6,327,418 B1 | 12/2001 | Barton | |
| 6,483,987 B1 | 11/2002 | Goldschmidt Iki et al. | |
| 6,490,722 B1 | 12/2002 | Barton et al. | |
| 6,571,390 B1 | 5/2003 | Dunn et al. | |
| 6,763,179 B1 | 7/2004 | Park et al. | |
| 6,785,465 B1 | 8/2004 | Koshino et al. | |
| 6,920,281 B1 | 7/2005 | Agnibotri et al. | |
| 7,171,110 B1 | 1/2007 | Wilshire | |
| 7,474,832 B2 * | 1/2009 | Boston et al. | 386/294 |
| 7,689,510 B2 * | 3/2010 | Lamkin et al. | 705/51 |
| 7,706,531 B2 * | 4/2010 | Yoshida et al. | 380/201 |
| 2003/0086023 A1 * | 5/2003 | Chung et al. | 348/714 |
| 2003/0118014 A1 * | 6/2003 | Iyer et al. | 370/389 |
| 2003/0180031 A1 | 9/2003 | Kikuchi et al. | |
| 2004/0073954 A1 | 4/2004 | Bjordammen et al. | |
| 2004/0258390 A1 * | 12/2004 | Olson | 386/46 |
| 2005/0050578 A1 | 3/2005 | Ryal | |
| 2007/0127887 A1 | 6/2007 | Yap et al. | |

* cited by examiner

*Primary Examiner* — David Harvey
(74) *Attorney, Agent, or Firm* — John P. O'Banion

(57) ABSTRACT

Systems and methods are described for personal video recorders (PVRs) and other devices configured for recording and playing back media content from a data storage unit, preferably a random access unit such as a hard drive. A system is described having network connectivity, such as a power-line communications, with other PVRs or similar units, wherein media content can be automatically shifted from one unit to another over the network, such as in response to changes in available storage space. Content transfers and deletions within the system being intelligently performed based on content status, user preference settings, and user preference information such as received from a preference engine, toward optimizing the value to the user of the content which is retained network wide. An additional aspect provides content restoration after mistaken deletion by the user or automated deletion functions.

11 Claims, 3 Drawing Sheets

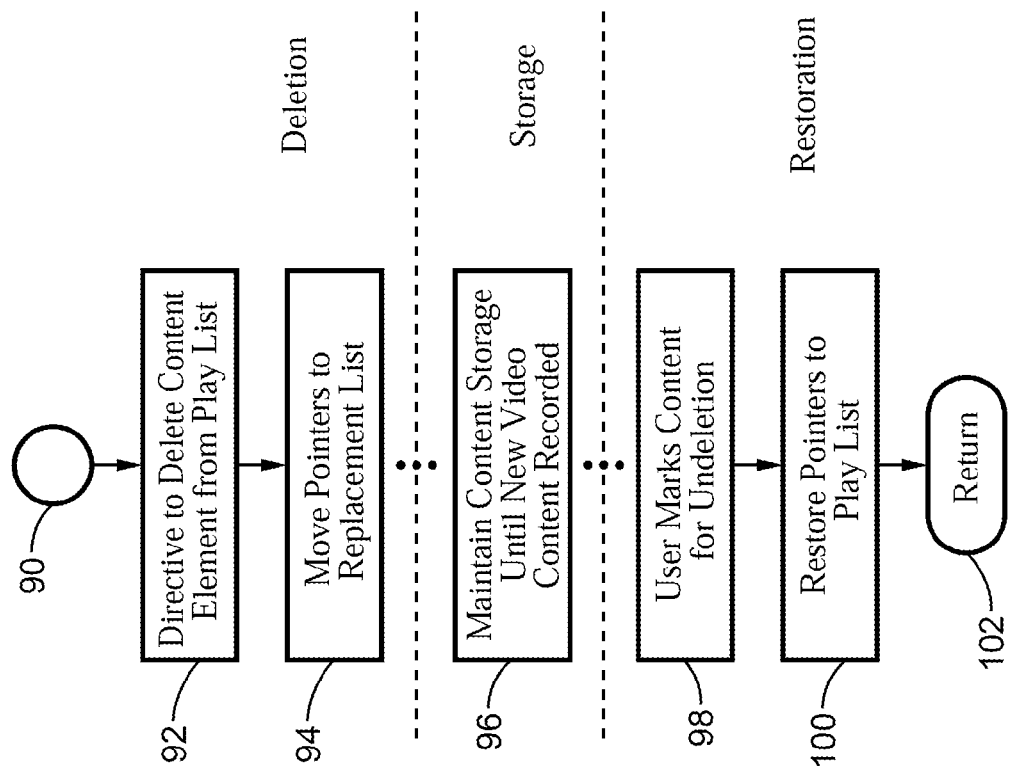

METHODS FOR CONTENT REDISTRIBUTION WITHIN NETWORKED RECORDING DEVICES

CROSS-REFERENCE TO RELATED APPLICATIONS

This application is a divisional of U.S. patent application Ser. No. 10/652,793 filed on Aug. 29, 2003, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to devices for recording and playing back of media content, and more particularly to automatically transferring content between devices connected over a network, and restoring content subsequent to user deletion.

2. Description of Related Art

Media devices such as personal video recorders (PVRs), digital video recorders (DVRs), set-top-boxes (STBs), Web TV systems, and the like are increasingly incorporating random data storage units, in particular hard disk drives, allowing media content to be retained and accessed as desired. The capacity of these disk drives often allows a large number of programs and full-length motion pictures to be retained. The term PVR, or video recording device, will be utilized herein to refer to all such described media devices having random access storage capability upon which media content can be recorded and retained.

As the disk becomes full of recorded content, additional content can not be recorded until some content is either deleted, moved to another device, or transferred off the unit onto a removable media. If the PVR is configured for timed recording, the system will be unable to record the scheduled programming. On current video recorders the user needs to delete elements of the existing content prior to the recording of additional content to free sufficient video content space upon which additional video content may be recorded.

When content is marked for deletion on a PVR, the actual content may be erased or the storage allocations remapped to free the content space for other content. When mistakes are made in marking content for deletion on current video recorders, the deleted content can not be "undeleted". Examples of content deletion "mistakes" include a user inadvertently selecting the wrong content for deletion, a spouse or family member deleting content important to the individual, or the content being automatically deleted in response to the lapse of retention time period, or other retention control parameter.

Therefore, a need exists for systems and methods that overcome problems associated with content recording and deletion as outlined above. The present invention satisfies those needs, as well as others, and overcomes the deficiencies of previously developed personal video recording systems.

BRIEF SUMMARY OF THE INVENTION

The present invention provides methods and systems for improving user control of retained content. A method of automated intelligent content shifting is described wherein a PVR connected over a network, such as a wired or wireless LAN, or power-line communications (PLC) network, can move content to another storage device connected on the network to balance content storage which allows additional content to be recorded. The content shifting being preferably performed in response to content status along with user preference settings and user preference information received from a preference engine within the PVR that tracks user preferences with regard to program recording and viewing. A method of recovering content marked for deletion is also described wherein content marked for deletion is only overwritten as the space is utilized, up to that time allowing the content to be recovered.

In one embodiment, the automated content shifting is performed within an apparatus, herein referred to as a video storage device, or personal video recorder (PVR), for recording and playing back video streams, which comprises one or more of the following in combination:

(a) A video interface configured for receiving or transmitting video streams.

(b) A network communications interface capable of transmitting and receiving video streams over a communication network, such as a wired or wireless LAN, power-line communication network or similar.

(c) A data storage unit configured for retaining video content, such as storing broadcast programming for later viewing.

(d) A computer processor for controlling the recording and playing back of video content to and from the data storage unit through the video interface.

(e) A mechanism (means) for automatically transferring video content over the network communications interface between different video storage devices over the network to redistribute content. The means may be implemented by programming executable by the computer processor for carrying out the operations of (i) detecting that available content storage space on a first video storage device is below a preferred minimum value of available content storage space; and of (ii) transferring an element of content to another video storage device which has sufficient content storage space to receive the additional content. Transfers may also be generally initiated in response to detecting that a sufficient change in available content storage space has arisen or the upcoming needs for storage space have changed. It should be appreciated that the video storage apparatus may be implemented within a system expressly designed for this feature, or as programming or programming changes within existing network-enabled video recording and playback devices without the necessity of adding additional hardware.

In one embodiment, the method of redistributing (transferring) content between PVRs generally comprises one or more of the following steps in combination:

(a) Tracking the available content space within a personal video recording unit. This can be tracked in relation to time, bytes, percentage of storage, or any other desired form of content storage space measurement.

(b) Determining that a sufficient change in availability of content space has occurred in the video recording device. This determination may be in response to an increase or decrease which crosses a threshold or a change in available content space of sufficient proportion (i.e. 30 minute change). For example, the amount of available content space can be checked against a predetermined or variable threshold value. For example, a fixed minimum threshold of at least three hours of recording, wherein sufficient space is thereby available to record a full-length feature or a basketball game. Preferably, the storage space threshold can be measured based on an amount of time, storage space, or a proportion (i.e. 5% or 10% of overall content storage space).

(c) Establishing communication with other video recording devices adapted for content storage and retrieval over the network.

(d) Determining content space availability within each of the other video recorder devices. Utilizing a network protocol over the established communication path allows a first video recorder unit to request available space information from the other devices connected to the network.

(e) Determining which content should be transferred in either direction between the first video recorder device and other video recorder devices. Although any content can be moved over the network between video recording devices, the system preferably makes that determination based on content status information, user preference settings, and/or user preference information as may be received from a user preference engine. For example, content may be selected based on the size of the content elements that must be transferred in order to free up sufficient content space on the video recorder device to reach the desired minimum available storage level. Content may be distributed over the network according to a fixed order, such as oldest first, least likely to be utilized and so forth. This functionality is preferably performed in response to information from a user preference engine within the PVR that has some understanding for viewer preferences, such as collected as the user utilizes the system as well as user preference selections. For example, the system can utilize information about where such content is normally viewed as a factor in determining where it is transferred (i.e. viewing location may be registered for content recorded from the same recording schedule). For instance a regular broadcast program may be recorded at location #1 on the network, such as a living room, yet the user may watch it from location #2 on the network such as a bedroom. Wherein the system may elect to transfer this regular broadcast programming to location #2 if sufficient space exists on that device. The selection of content to transfer may be in response to other user selected or programmatic criterion.

(f) Establishing programmatic references to content that is to be moved. Pointers or similar data structures are established in preparation for the content transfer.

(g) Copying is performed in either direction between the video recorder devices over the network. The transfer generally comprises transferring a series of blocks following a pointer chain to the destination.

(h) It is also preferable that the result of the copy operation be verified to assure that content is available at the destination before any action is taken with regard to removing source content. Verification can take many forms, from chaining through allocation pointers for the content and checking the destination content size, to testing for comparable checksums or data signatures derived in response to other algorithmic mechanisms.

(i) Finally, the source content can be marked for deletion on the video recorder device since it has been successfully copied to the given other device.

In one embodiment, restoration of content can be implemented within an electronic device for recording and playing back video streams that generally comprises one or more of the following in combination:

(a) A video interface configured for receiving or transmitting video streams.

(b) A first video storage device configured for retaining video content.

(c) A user interface for receiving recording and playback commands from a user. These commands include selecting content for deletion from a play list or similar, and selecting content within a replacement list for restoration to the play list (undeletion) if at least portions of the content have not yet been reused for the storage of replacement video content.

(d) A computer processor for controlling the recording and playback of video content from the first video storage device in response to user commands, and user settings such as the recording schedule. The processor (or processors) preferably orchestrates all actions of the device in response to the execution of programming.

(e) A mechanism (means) for removing an element of video content displayed on the play list, and for deferring the release of associated content storage space upon which the video content is recorded until the space is needed for recording additional content. The means for removing an element of video content preferably comprises programming executable on the computer processor for carrying out the operations of: (i) receiving a directive to delete an element of content from within the play list of a video recorder; (ii) moving pointers to the element of content from the play list to a replacement queue, within which units of content storage remain associated with their element of content until reused when recording additional content.

Preferably the present invention does not allow the user to erase all content referenced in the replacement list, although they may optionally change or select the order of content replacement. Furthermore, the system can be optionally configured to allow a specific content element in the replacement list to be physically erased, or deallocated, such as in the case of recorded content deemed inappropriate for viewing within the household wherein complete removal of the content from the system is desired.

To restore deleted content, the apparatus preferably comprises means for restoring video content which has been removed from the play list and whose content storage space has not yet been reallocated to other content, back onto the play list in response to an undeletion command from the user directed at the content. The means for restoring video content preferably comprises programming executable by the computer processor for carrying out the operations of: (i) receiving a user command to undelete an element of content previously deleted from the play list; and (ii) moving pointers to remaining portions of the element of content from a replacement list (queue) back into the play list.

The method steps for allowing deleted media content within a PVR to be restored is preferably performed in response to programming executable on a computer processor within the PVR, which in one embodiment can generally be considered to comprise one or more of the following steps in combination:

(a) Removing an element of video content from the play list and entering it into a replacement list in response to a video content deletion directive. The directive may be in response to a command received from the user, or from programming that performs automated content deletions (on the individual recorder device or in response to automatic redistribution of content over the network).

(b) Deferring the release of the content storage space upon which the elements of video content are recorded within the replacement list until the content storage space is needed for recording additional video content.

(c) Releasing sufficient content storage space upon which an element of video content is recorded within the replacement list, in response to recording of new video content within the video recording device.

(d) Restoring an element of video content, for which at least a portion of the content storage space has not been released, from the replacement list to the play list in response to an undelete command received from the user to the content element within the replacement list.

The present invention described above may be implemented in a number of alternative ways, and can provide a number of beneficial aspects, including but not limited to the following.

An aspect of the invention provides automated transfer of content between networked devices configured for storing video streams, so that recording operations are not hindered on a given device by lack of available recording space.

Another aspect of the invention provides for user control of the thresholds utilized for determining if content is to be transferred between devices on the network.

Another aspect of the invention provides for selecting content for transfer based on the user selected categorization of the content, such as archival, temporary, permanent, and so forth.

Another aspect of the invention provides for selecting content for transfer based on information about the devices on the network, content history (status), user preferences settings, and user preference information which may be provided by a preference engine executing on the system.

Another aspect of the invention provides an automated content deletion mechanism wherein content is intelligently deleted in response to content status, user preference settings, user preference information from a preference engine, and the need or availability of content storage space by other video recorder devices communicating over the network.

Another aspect of the invention provides a content deletion mechanism wherein content subject to a user deletion command can be subsequently restored as an available program listed on the content play list.

Another aspect of the invention provides a content deletion mechanism wherein content can be restored so long as any of it remains in a replacement list having not been utilized for storing additional content.

A still further aspect of the invention is that the reuse of content from the replacement list can be subject to user preferences and information about the history of the content, such as if, or which portions, were played back.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 3 is a flowchart of content deletion, storage, and restoration according to an aspect of the present invention.

DETAILED DESCRIPTION OF THE INVENTION

Figure 1:
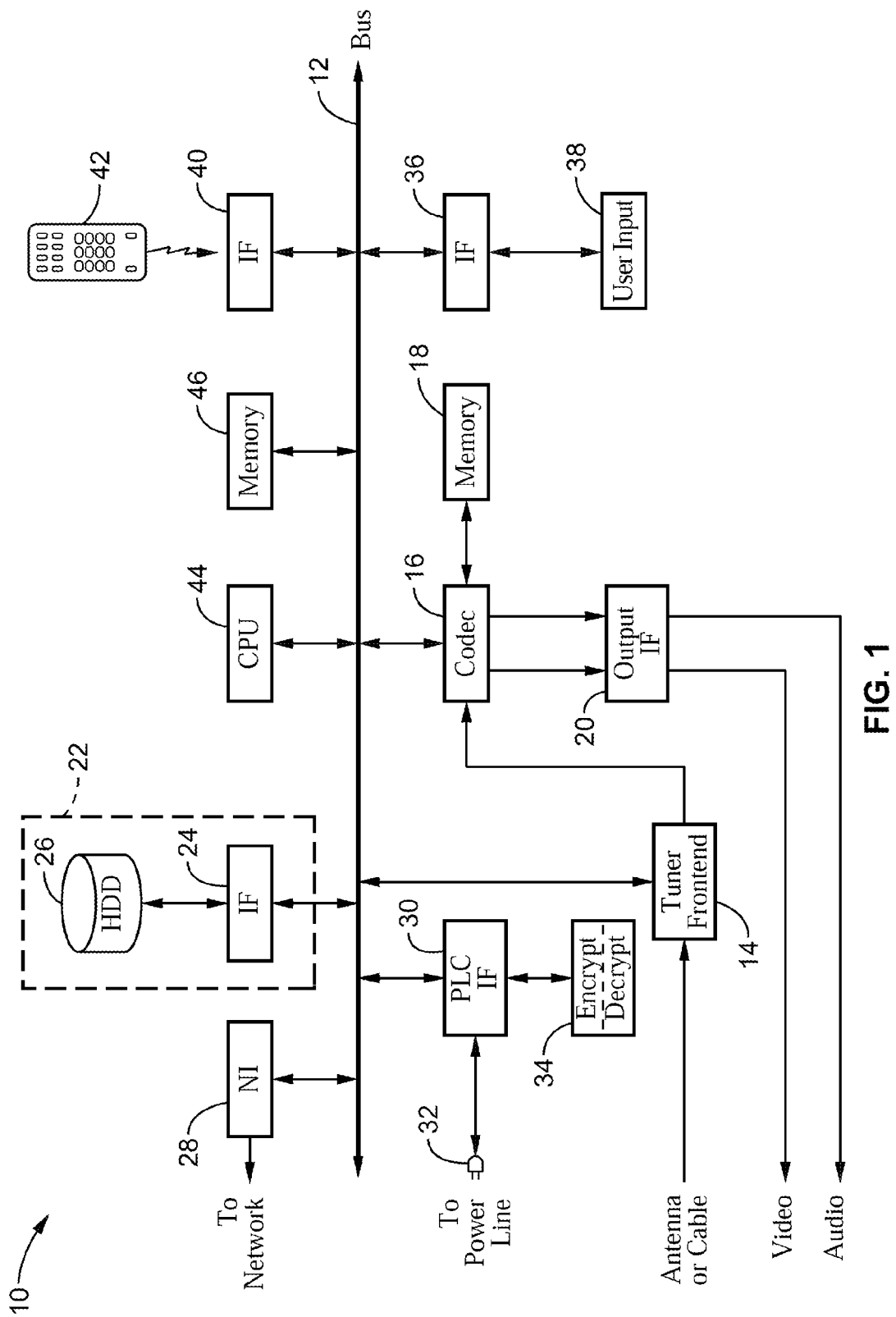
FIG. 1 is a block diagram of a system configured for performing the automated transfer and restorable deletion operations according to an embodiment of the present invention.
Figure 2:
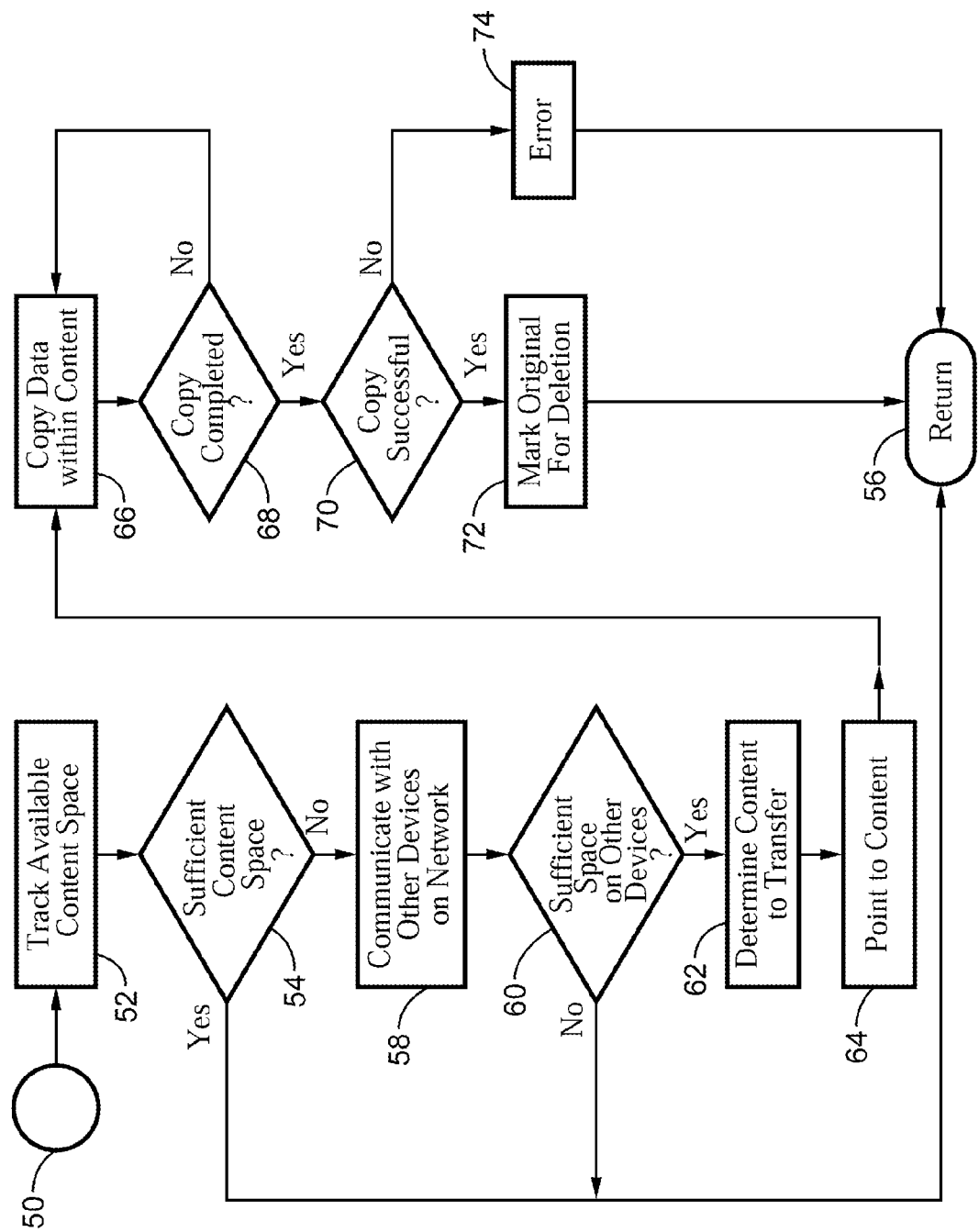
FIG. 2 is a flowchart of automated content transfer to other networked recording devices according to an aspect of the present invention.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

1. Automated Content Shifting from a Networked PVR

A video recorder device (PVR) having connectivity over a network, such as a power-line network within a residential setting, according to this aspect of the invention automatically moves recorded content around to balance the storage utilization on various networked recorder units toward optimizing network wide user "value" of the content retained on the PVRs connected to the network. The PVR device of the invention generally performs automated content deletion and distribution, preferably performed intelligently in response to content status user preferences. The invention is applicable to PVRs (or other devices capable of storing content) which are interconnected over a communication network or link.

Storage balancing between PVRs on the network is preferably performed in response to content status, user preference settings, and user preference information such as derived from a preference engine within the PVR which determines user preferences from monitoring system usage and from preferences entered by the user. As the storage availability on a particular PVR drops below a threshold (predetermined, relative, or variable), the PVR searches for other units on the network with sufficient storage space and transfers elements of content to the other unit. The programming is then deleted from the first PVR providing room for storing additional content, such as broadcast programming according to manually activated recording or a recording schedule. The viewer can retrieve the content from any of the networked units and watch the content from the originating PVR, or from the other devices connecting to the network and configured for viewing network content.

Additionally, if storage availability on a first PVR increases, such as resulting from automated or user deletion of one or more content elements, then a message can be sent to other PVRs and storage balancing initiated. Storage balancing occurs in this case as the first PVR with "extra" available content space alerts other PVRs which can then shift content to the first PVR.

In general, the content transfer can be initiated in response to any sufficient change in content space availability within a video recorder, or change in upcoming needs for additional space (i.e. scheduled recording).

Communication between video recorder devices over the network can operate in combination with automated content deletion, wherein the need expressed for content space by a first PVR results in a second PVR deleting content of low value so that a transfer of content from the first PVR may take place. The system is configured to allow assessing the relative value of content elements on a network wide basis, so that the content which is retained has the estimated highest value to the user.

FIG. 1 illustrates an example embodiment of a PVR 10 whose programming can be adapted for performing the described content transferring. It should be appreciated that the PVR may comprise a DVR, STB, or other device capable of recording and playing back video content from a video storage device, preferably a random access data storage unit such as the depicted hard disk drive. An internal bus 12 connects a number of functional elements within the unit. A tuner front-end 14 is configured for receiving a RF signal from an antenna or a cable network. Codec block 16 in combination with memory 18 decodes the demodulated signal from tuner front-end 14. The decoded digital video signal is then converted within an output interface 20 for display and/or audio output. It should be appreciated that output interface 20 may be configured to support any desired audio or video standard for playing a media stream.

The media stream can be transferred by codec 16 over bus 12 to a data storage subsystem 22 for recording. Data storage subsystem 22 is exemplified with a storage interface 24 shown connected to a hard disk drive 26. It will be appreciated that other forms of data storage may be utilized additionally or alternatively in place of hard disk drive 26, for example solid state storage, removable media storage, and so forth. It should be appreciated that multiple data storage devices may be supported within the PVR, which may include removable media drives that provide archival access to data and streams.

PVR 10 can be networked in a number of alternative ways according to the invention, with other devices configured for storage and retrieval of media streams. For example, a network interface 28 may comprise a wired or wireless interface to a LAN. Another preferred networking method is that of a power-line communication (PLC) network, to which the PVR is connected via a PLC interface 30 connecting through a power-line 32, and preferably supporting an encryption/decryption means 34.

Media streams, such as broadcast programming received through a cable, satellite antenna, or conventional VHF/UHF antenna, may be received through tuner 14 for storage on data storage device, or subsystem, 22. Similarly content may be received over network interface 28 or power-line communications interface 30, from other devices for storage on data storage subsystem 22. To replay a recorded stream, codec 16 receives the media stream from data storage subsystem 22 over bus 12 and decodes it for output.

User control of PVR 10 may be according to any convenient method, such as received through a panel mounted command interface 36 from one or more devices 38, such as a keypad, keyboard, discrete buttons, cursor control device (pointing device), other input sources and combinations thereof. PVR operations may be alternatively or additionally controlled remotely through a wireless interface 40, receiving input from a wireless device 42, such as a remote control unit utilizing infrared (IR) communication, wireless communication, and so forth.

Operation of the circuitry connected to bus 12 is controlled by a central processor 44 in combination with memory 46 which contains both programming executable on processor 44 along with data utilized by the programming. It should be appreciated that various devices, such as PVRs, DVRs, STBs, and the like which are configured for storing and accessing media content, such as on a hard disk drive, can be configured with programming according to the teachings of the present invention. A preference engine may be integrated within processor 44 in combination with memory 46 (or alternatively a separate processor), which tracks user viewing habits and can preferably accept direct user feedback on preferences. The user preference engine allows "intelligent" decisions to be made regarding the distribution of PVR content. User preference engines are generally known in the art, wherein the details of implementation are not disclosed herein.

FIG. 2 illustrates an example embodiment of program flow for automatically transferring content to other devices on the network. The flowcharted programming being executable on a computer processor within the PVR, or similar device. For the sake of simplicity, the flowchart depicts the case where insufficient content space is detected. It should be appreciated that similar programming can control content transfers in response to any change in available content space, space requirements, or user preferences. The routine may be entered at block 50, such as in response to a periodic check, and/or a change in the amount of content retained on the device, or a pending change as would arise in response to a upcoming scheduled recording. The available amount of content space is then tracked as represented by block 52, such as by registering the remaining disk space upon which content may be recorded on the video recording unit. Preferably the system determines disk utilization from some form of disk allocation table or mechanism maintained for the disk blocks which together comprise each element of content, although the system can be adapted for tracking content availability with any form of content storage.

A check is performed on the sufficiency of remaining content storage space as per block 54. If at least the minimum space is available, then no transfers are necessary and execution can return to other processing at block 56. However, if it is determined at block 54 that insufficient content space remains in this PVR, then the PVR will initiate communication with other devices adapted for content storage and retrieval over the network as per block 58. From this communication the PVR gathers information on the availability of content storage on these other content storage and retrieval units. If insufficient space exists on these other units as represented by block 60, or if they are otherwise not configured for transferring content between devices on the network, then a transfer cannot be performed and execution returns as per block 56. Preferably, in this situation the system is configured for generating an alert to the user about the insufficient level of remaining disk space, in particular if upcoming (i.e. within 24 hours) scheduled recording times exceed the available content storage space.

If it is determined at block 60 that sufficient content is available at one of the other devices, then processing continues. If more than one video storage device is available for receiving the content, then a decision is made as to which video storage device to store the content on, such as the device with the most available space, or the device upon which this content is typically played, or any other desired selection metric. It is then determined at block 62 which element or elements of content are to be transferred. Although not shown on the flowchart, these decisions are based on user preference settings, and user preference information, such as received from a preference engine, which are preferably utilized in combination with status information for the content (i.e.

when recorded, when watched, category, etc.) References are then established to the content as per block 64 within the program in preparing for the transfer. For example a pointer is loaded to a first allocation entry associated with the content, wherein each allocation entry contains a pointer to subsequent blocks within the content. Alternatively, other structures can be prepared for executing a transfer operation of the content.

Copying of the video content from a first video storage device to the selected destination device commences at block 66 over the network. Blocks of content are copied until all content has been transferred as detected at block 68. After copying the content to the destination, it is preferable that the destination content be verified as represented by block 70. This verification, for example, may comprise checksumming or otherwise performing algorithms on the data blocks to generate signatures for comparing the source data and destination data. Typically the signature is included with the data transferred, wherein the destination compares the signature with the results of the same or equivalent signature generation algorithm to perform the verification. If the copy operation is found to be in error, then an error handler represented by block 74 is preferably executed which logs the error and can attempt recovery, such as retrying the copy operation a given number of times. In response to a successful transfer, the source content is marked for deletion as per block 72 prior to a return at block 56.

In a similar manner to the above the automatic transfer of content to other video storage devices (PVRs) on the network can be triggered in response to other preference choices. For example, a threshold may be set on the PVR wherein if the available storage space exceeds this threshold, such as in response to content deletion on the PVR, then the other PVRs are alerted over the network to the content availability. The network of PVRs are thereby kept apprised of available content space so that content may be intelligently distributed to maximize the value of content retained network wide.

In another example any sufficient change in available content space, or need for additional storage (i.e. upcoming recordings listed on a recording schedule) can trigger a communication over the network wherein the video storage devices determine if content transfer is warranted and can execute the necessary transfer of content.

Automatic content deletion can be integral to the content distribution performed within the system. Automatic content deletion being preferably performed in response to information from the preference engine. For example, when more space is needed on a first PVR, then information from the preference engine is used to determine which programs are the least likely to be missed by the user (of lowest value), which are then subject to deletion by generating a deletion directive. For example, if the user really enjoys westerns directed by John Ford and starring John Wayne, as indicated by information collected from the preference engine, then the movie "Breakfast at Tiffany's" could be deleted before "The Man Who Shot Liberty Valance", all other aspects of the decision being equal.

Furthermore, distribution of content is performed in keeping with the preferences of the user as determined by the preference engine. For example, if the show "Sex and the City" is normally recorded in the living room, but watched in the bedroom, the preference engine of the system recognizes this and will attempt to store the content on the PVR in the bedroom. If the viewer really likes the movie "Shrek" a copy of the movie may be retained on multiple devices. If the television in the bedroom is capable of showing high definition (HD) television, the preference engine may attempt to store the content on a PVR associated with an HD television. The preference engine can determine user preferences based on what content is recorded, viewed, deleted, moved, and can track information about the viewing systems associated with each PVR, and so forth.

2. Content Deletion and Recovery

Another aspect of the invention provides a method wherein content "deleted" by the user, or deleted automatically, can be recovered by the user. Content which is "deleted", that is which has been marked for deletion in response to a deletion directive, such as from a user or automated content deletion and distribution programming, is moved to a replacement queue, according to the present invention, in which the content is only overwritten as the space is utilized for recording additional content. The invention also provides mechanisms wherein the status of the content marked for deletion is taken into account along with user preference settings, and user preference information from the preference engine. Examples of aspects affecting the determination of which content is to be overwritten include the category of content, the elapsed time since the content was recorded, the extent to which the content has been accessed, user viewing preferences, user storage preferences, and other similar aspects of preference.

When an element of content is marked for deletion, such as in response to a user choice, or in response to an automated deletion and distribution function, such as when the program retention interval for the content has expired, the content is not removed from hard disk storage. Instead of physically deleting the content, a pointer to the storage areas associated with the content are put into a queue with the content remaining untouched until those content sections reach the top of the queue, or are otherwise selected, for use in storing additional content. Until the storage spaces holding the content have been reused, the content (or portions thereof) can be restored to the list of content available for playing, also referred to as a "play list", or "now playing list", and viewed. The collection of space occupied by the content marked for deletion preferably can not be physically erased or deleted in total, until the space utilized for storing the content is needed for storing additional content.

Space is reclaimed, therefore, on as as-needed basis using a caching replacement algorithm to determine how the space associated with content marked for deletion is to be reused based on queue entries. The caching replacement algorithm according to the invention can utilize a number of criteria for determining ordering of content within the queue, such as content status, user preference settings, and preference information received from the preference engine. By way of example a few of these preferences may include a viewer preference score derived from the preference engine, the original category of content (i.e. temporary, permanent, and so forth), the viewing state of the content (viewed, partially viewed, not viewed, and so forth), the length of time it has been marked for deletion, and other characteristics. The caching replacement algorithm of the system can reclaim for reuse portions of content that has already been accessed or viewed, prior to portions of the program that have not yet been accessed or viewed.

It will be appreciated that the caching replacement algorithm can determine the original placement of pointers to the content areas within the queue, and can also modify queue placements by reordering queue contents at any desired time in response to user preferences, system information, and/or events.

FIG. 3 illustrates an example embodiment of program flow for allowing video content to be restored for playback subsequent to a directive for deleting a content element, such as from a user or the automated deletion and distribution functions of the system. This aspect of the invention can be implemented on hardware exemplified in FIG. 1 which does not require any external communication mechanisms, such as network interface 28 or power line interface 30. Preferably the invention is implemented as programming which executes on a processing element within a PVR, STB, or similar device which is capable of recording video content.

The method steps illustrated in FIG. 3, indicate the operation of programming during deletion, storage, and restoration of content. The method can be considered to generally comprise programming which commences at block 90 wherein the user has already selected (i.e. "selection" event generated), or moved the cursor over (i.e. "cursor-over" event generated), an element of content listed on a play list or similar. A deletion directive is received, such as from a user command or automated deletion programming as represented by block 92. Under automated deletion the status information about the video content is considered, and user preference settings or information is also preferably taken into account, such as received from the user preference engine of the PVR.

The system responds as per block 94 by moving the content, or preferably pointers to the content, to the replacement list wherein it no longer is displayed within the play list and appears deleted. The content is not, however, physically deleted or lost which can occur for example by dropping the head allocation pointer in a chain of blocks allocated to the content. The "deleted" content remains in the replacement list as represented by block 96, which is stored on the random access storage device (i.e. hard drive), unless that storage space is needed for the recording of other streams. The replacement list can be structured as a queue (i.e. first-in-first-out, FIFO, queue), linked list, or other form of data structure.

The reuse of the content storage space taken up by the "deleted content" can be determined on a first deleted basis, and/or other selection criterion. Preferably, content reuse is also intelligently driven in response to content status, user preference settings, and user preference information, such as information received from the preference engine. Examples of selection criterion include basing the decision on the content history, such as the user categorization of the content (i.e. archive, temporary, permanent, and so forth), when content was recorded, has it been played, what portion has been played, and other information preferably utilized in combination with user preferences and history of the content itself.

At some subsequent time, which could be days or even weeks later depending on the frequency of PVR use, the user realizes that content has been deleted to which access is desired. The user enters a command to the PVR system to gain access to remaining content elements stored in the replacement list. The user can then select a listed element of content from within the replacement list as represented by block 98. The content is preferably listed in the replacement list so long as any of the sections of data remain and have not been reallocated for the storage of new content.

For example, the system may be configured to free up portions of content which have been watched by the user prior to unwatched portions, wherein it handles updating allocation pointer strings, or similar allocation mechanisms, as necessary to retain the association between the name of the content and the remaining unwatched content portions thereof.

The content selected by the user for "undeletion", is then restored to the play list as per block 100, such as by moving the content, or more preferably one or more pointers or data structures referring to the content, back into the play list along with the information about the content. If only a portion of the content can be restored, then the system preferably notifies the user prior to completing content restoration to the play list, thereby allowing the user to decline restoration of incomplete content. The user may be notified as to what content was overwritten, such as "First 15 minutes not available, was viewed mm/dd/yy" or similar. After restoring content to the play list, the sequence is completed as represented by the return from the procedure in block 102, unless other optional restoration steps are performed, such as entering notes from a user, undeleting other elements of content from the replacement list and so forth. Furthermore, the system preferably includes a notification within the play list if only a portion of the content could be restored. This serves as a reminder to the person that restored the content, and a notification to other parties of the incomplete nature of the restored content.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of redistributing content within a networked video recording device, comprising:

tracking the amount of available content storage space within a video recording device;

determining that a sufficient change in the availability of content storage space has occurred on a first video recording device;

establishing communication with other video recording devices adapted for content storage and retrieval over said network;

determining content space availability within said other devices;

determining which content is to be transferred in either direction between said first video recording device and other video recording devices;

establishing programmatic references to content that is to be transferred between video recording devices;

copying data in either direction from between said first video recorder device and said other video recorder device over said network;

verifying that the copy operation has completed successfully; and marking content for deletion on the video recorder device from which the content was successfully copied.

2. A method as recited in claim 1, wherein said tracking of the available content storage space comprises determining the amount of available storage space registered as a recording time value.

3. A method as recited in claim 1, wherein said tracking of the available content storage space comprises determining the amount of available storage space as a percentage of total content space that remains available for use.

4. A method as recited in claim 1, wherein determining the insufficiency of remaining content space comprises:
 comparing the available content space with at least one fixed or variable content space threshold; and
 determining that less content space is available than given by said fixed or variable content space threshold.

5. A method as recited in claim 4, wherein said content space threshold is responsive to entries made in a recording schedule.

6. A method as recited in claim 4, wherein said content space threshold is responsive to historical information about recording performed with said video recorder device.

7. A method as recited in claim 1, wherein said determination of which content is to be moved is responsive to user preference settings or user preference information from a user preference engine.

8. A method as recited in claim 1, wherein establishing programmatic references to said content comprises loading one or more pointers to blocks of data containing said content and subject to transfer over said network.

9. A method as recited in claim 1, wherein said determining that a sufficient change in video content storage space has occurred comprises detecting that the available video content storage space has dropped below a threshold value.

10. A method as recited in claim 1, wherein said determining that a sufficient change in video content storage space has occurred comprises detecting that the available video content storage space has increased above a threshold value.

11. A method as recited in claim 10, further comprising communicating the increase in available video content storage space over the network with other video recording devices which have video content to be transferred.

* * * * *